No. 714,955. Patented Dec. 2, 1902.
C. W. SHARTLE.
FASTENING FOR DIVIDED WHEELS.
(Application filed Apr. 7, 1902.)
(No Model.)

Witnesses:
E. R. Shipley.
M. S. Belden.

Charles W. Shartle
Inventor
by James W. See
Attorney

UNITED STATES PATENT OFFICE.

CHARLES W. SHARTLE, OF MIDDLETOWN, OHIO.

FASTENING FOR DIVIDED WHEELS.

SPECIFICATION forming part of Letters Patent No. 714,955, dated December 2, 1902.

Application filed April 7, 1902. Serial No. 101,666. (No model.)

*To all whom it may concern:*

Be it known that I, CHARLES W. SHARTLE, a citizen of the United States, residing at Middletown, Butler county, Ohio, have invented certain new and useful Improvements in Fastenings for Divided Wheels, of which the following is a specification.

It is very common in providing shafts with pulley or gear wheels to form the wheel in two halves united on a diametrical joint-line, the two halves of the wheel being firmly secured together upon the shaft. Numerous devices for attaching the wheel-halves together have been contrived, many of them quite satisfactory under some conditions, but none of them satisfying some peculiarly-exacting conditions. Thus, for instance, in electric-railway cars a spur-gear is fast upon the car-axle and driven by a pinion from the motor, the gear being formed in halves, so that it can be applied and removed without removing the car-wheels from the axle. All ordinary means for securing the two gear-halves together are lacking in satisfactory results. The cramped condition of affairs prevents satisfactory manipulation of some types of fastenings used in these gear-wheels, and the peculiar condition of service tends to rattle them loose, and any loosening of the fastenings permits relative displacement of the two halves of the gear, under which condition the pinion will not act properly upon the gear and damage to both pinion and gear is quite apt to result.

My present invention relates to an improved means for securing together the two halves of a divided wheel; and the invention will be readily understood from the following description, taken in connection with the accompanying drawings, in which—

Figure 1:
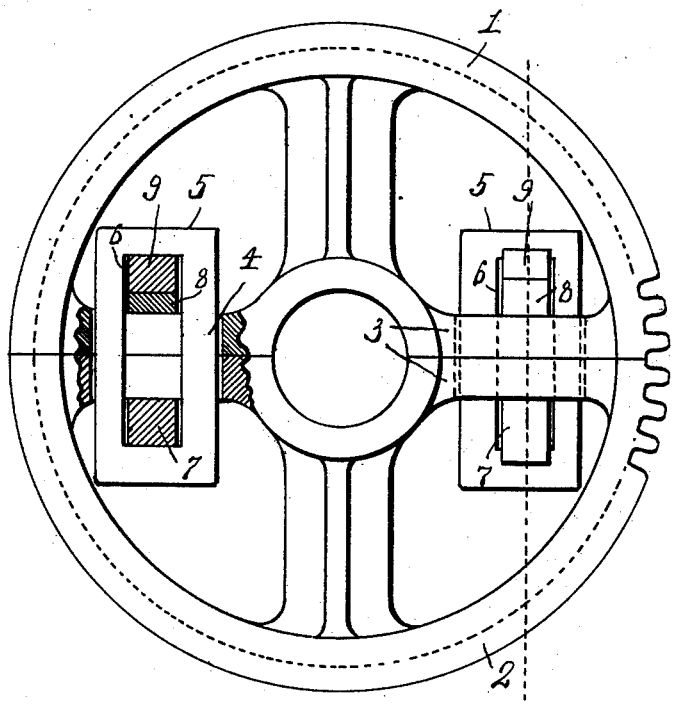
Figure 2:
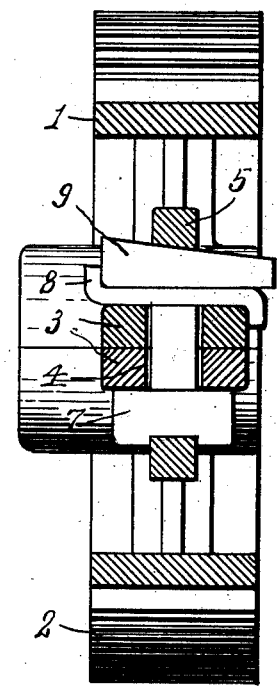

Figure 1 is a face view of a divided gear provided with my improved fastenings, the arms at one of the fastenings appearing in vertical longitudinal section; and Fig. 2 a vertical transverse section of the gear through one of the fastenings.

In the drawings, 1 indicates one of the halves of the gear; 2, the other half; 3, the arms at the diametrical joint between the halves, these arms being flat and divided, so that each wheel-half is provided with flat arm-halves at the joint; 4, mortises through the arms 3, one mortise at each side of the hub; 5, a link disposed loosely within each of the arm-mortises; 6, a mortise through each of these links of such linear extent as to present an opening exterior to each face of the double arm; 7, a gib disposed across the mortise in each of the mortised links and engaging an exterior face of the double arm; 8, a keeper-bar, one for each of the mortised links, disposed within the mortise of the link and extending across and engaging the exterior face of the double arm opposite the face engaged by the gibs 7, and 9 a key, one for each mortised link, driven into the mortise of the link between the keeper-bar 8 and the upper end of the mortise.

In applying the wheel whose halves are to be preferably doweled together, as usual, the two halves are assembled upon the shaft with the mortised links in position, the gibs 7 being applied either before or after the wheel-halves are assembled. The keeper-bars 8 in straight form are then placed in the mortises, after which the keys are driven, thus firmly uniting the two wheel-halves. The ends of the keeper-bars at the heads of the keys are then bent up to serve as keepers for the keys, the opposite ends of the keepers-bars being provided with bends to engage the edges of the wheel-arms, these bends of the keeper-bars being formed either before the keeper-bars are put in place or after the keys are driven, as desired. The keys may at any time be more firmly driven and an extra set given to the bends of the keeper-bars. To dissociate the parts, the ends of the keeper-bars at the heads of the keys are bent down out of the way, so that the keys may be backed out. For comparatively small wheels it is sufficient to apply one of these fastening devices at each side of the hub, as indicated in the drawings, the result being a proper tightening of the wheel-halves at the hub and rim.

The device will be found peculiarly efficient and subject to none of the annoying disarrangements and accidents common to ordinary devices employed for the purpose.

I claim as my invention—

In fastenings for divided wheels, the combination, substantially as set forth, of wheel-sections provided with mortised flat arms at the joint of division, mortised links disposed in the mortises of the arms, gibs disposed in one end of the mortise of each mortised link and engaging against one face of the joint-arms of the wheel, a keeper-bar disposed in the mortise of each mortised link and engaging the face of the joint-arms of the wheel opposite the face engaged by said gibs, and a tapering key in the mortise of each mortised link and engaging between the end walls thereof and said keeper-bars.

CHARLES W. SHARTLE.

Witnesses:
W. T. HARRISON,
B. HARWITZ.